United States Patent [19]

Madewell

[11] 4,381,440
[45] Apr. 26, 1983

[54] CONTROL CIRCUITRY FOR PRODUCING VARIABLY RIFLED TUBES

[75] Inventor: George R. Madewell, Soddy, Tenn.

[73] Assignee: Combustion Engineering, Inc., Windsor, Conn.

[21] Appl. No.: 228,511

[22] Filed: Jan. 26, 1981

[51] Int. Cl.³ .............................................. B23K 9/04
[52] U.S. Cl. .................................. 219/62; 219/76.14; 219/125.11
[58] Field of Search ............... 219/62, 125.11, 76.14, 219/59.1, 60 R, 60 A

[56] References Cited

U.S. PATENT DOCUMENTS

| | | | |
|---|---|---|---|
| 2,912,562 | 11/1959 | Donovan | 219/76.14 |
| 2,927,195 | 3/1960 | Arnaud | 219/125.11 |
| 3,272,961 | 9/1966 | Maier, Jr. et al. | 219/76.14 |
| 3,627,973 | 12/1971 | Smith | 219/76.14 |
| 4,215,809 | 8/1980 | Davis | 219/76.14 |

*Primary Examiner*—C. C. Shaw
*Attorney, Agent, or Firm*—Arthur E. Fournier, Jr.

[57] ABSTRACT

An electrical circuit (102, 102') employable in cooperative association with welding means (90) for purposes of effecting the application of a weld deposited rib on the inner wall surface of a boiler tube (10), and through the use of which control is exercised over the size, pitch and pattern of the rib. For purposes of exercising control over the rib size and the rib pitch, the subject electrical circuit (102, 102') includes first (104, 104'), second (106) and third (108) electronic speed controller means that are connected in electrical circuit relation to the rotational motor means (92) of the welding means (90), the linear travel motor means (94) of the welding means (90), and the wire feed motor means (96) of the welding means (90), respectively. Further, the subject electrical circuit (102, 102') includes a dual purpose electronic speed controller means (148) that is connected in electrical circuit relation with each of the first (104, 104'), second (106) and third (108) electronic speed controller means so as to be operative to exercise control over each of the latter by means of a common speed adjusting switch (150) that the former has associated therewith. For purposes of exercising control over the nature of the rib pattern, the first electronic speed controller means (104') and the rotational motor means (94') of the welding means (90) are each of the servo type so that there may occur the rapid reversing thereof, which is required in the course of the formation of the types of rib pattern that are desired to be applied to the boiler tube (10) inner wall surface.

11 Claims, 11 Drawing Figures

CONTROL CIRCUITRY FOR PRODUCING VARIABLY RIFLED TUBES

BACKGROUND OF THE INVENTION

This invention relates to a tubular member having fluid flow control means positioned on the inner wall surface thereof operable for purposes of effecting control over the movement of fluid flowing through the tubular member, and more particularly, to an electrical circuit employable in cooperative association with welding means for purposes of effecting the application of the aforesaid fluid flow control means on the inner wall surface of the tubular member.

It is widely known that a major operating component of any conventionally constructed steam generation system is the boiler. Likewise, it is widely known that it is in the boiler that the generation of steam is actually effected. In this regard, the aforesaid generation of steam is commonly accomplished as a consequence of the passage of water through a multiplicity of tubular members, i.e., tubes, during the passage of which the water is sufficiently heated so as to cause it to change state, i.e., to change from liquid to a vapor.

Within a heat transferring or vapor, i.e., steam, generating system, there exists an infinite number of conditions relating to temperature, primary and secondary fluid movements, and structural configurations that influence the performance thereof. Accordingly, it is both desirable and beneficial to have the capability to design into such systems precise and accurate control of the fluid movement therewithin so as to maximize the efficiency of the system.

In this regard, there can be found set forth in copending patent application Ser. No. 73,967, which was filed on Sept. 10, 1979, now U.S. Pat. No. 4,314,587 and which is assigned to the same assignee as the present invention, a boiler tube that is provided on the inner surface thereof with the physical characteristics that are required thereby in order to insure the existence of a proper fluid movement therethrough, i.e., so that the heat transfer rate to the fluid medium is maximized. In accord with the teachings of the aforesaid copending patent application, the tube bore surface is made uneven such as, for instance, by deforming the existing tube material, or by affixing additional material thereto as through the welding thereof, or by depositing weld metal thereon. Such modifications of or additions to the material that constitutes the tube bore surface is intended to function to provide a turbulence to the fluid thereby tending to eliminate a temperature gradient within the fluid at any cross sectional plane taken across the tubular area. In addition, this exercise of control over the fluid motion within the tube is also intended to function to prevent the formation of vapor pockets or vapor layers adjacent to the tube inner wall surface that operate to provide an adverse effect on the heat transfer properties of the medium.

Obviously, it is important that boiler tube failure be avoided in steam generating systems. Moreover, one cause of boiler tube failure is known to be that of overheating of the tube. Furthermore, it is known that an inefficient transfer of heat through the tube wall to the water, i.e., fluid medium, flowing therewithin can lead to the tube overheating. The reference here to an inefficient transfer of heat through the tube wall is meant to encompass the situation wherein the accomplishment of the desired heat transfer process is impeded by the presence of so-called nucleate boiling, i.e., wherein stagnation of steam bubbles that function in the nature of insulation impedes the passage of the heat through the tube wall to the water flowing therewithin.

To summarize, the condition, which is sought to be avoided here in an effort to minimize the susceptibility of the tube becoming overheated as a result of nucleate boiling, is that wherein there exists within the tube a laminar flow of water or steam. As used herein, the term laminar flow is meant to refer to a streamline or viscous flow of the fluid axially of the tube. Namely, what is desired is the effectuation of the breaking up of such laminar flow in the tube.

As the water flows through the tube, the outer layer of the water, i.e., the layer of water in closest proximity to the inner wall of the tube, becomes heated by the heat being transmitted through the tube wall. As a consequence thereof, the outer layer of water changes to steam. During this process of changing to steam, the first change, which the outer layer of water undergoes, is the formation therein of steam bubbles. Mention has previously been made herein of the fact that steam bubbles act as an insulation. Consequently, unless the steam bubbles, which are being formed in the outer layer of water, are made to mix, they will, in essence remain stationary, i.e., stagnate, and take on the attributes of an insulative film, thereby causing localized hot spots to develop along the tube wall. Moreover, such hot spots, in turn, can cause overheating of the tube, and ultimately lead to tube failures. Additionally, unless they are made to mix, the steam bubbles, by virtue of their insulative capability, will also function to prevent further heating of the core of water, which is rapidly passing through the center of the tube in the form of laminar flow, the latter term being employed herein as defined above.

From the preceding discussion, it thus should now be readily apparent that in order to achieve the rapid and efficient transfer of heat through the tube walls to the water flowing therewithin, there exists a need to provide some form of means that would be operative to effect the breaking up of the laminar flow of water through the tube. Namely, some such form of means is needed to effect the mixing of the outer layer of water and thereby also the steam bubbles entrained therein with the core of water flowing in the central region of the tube. As noted previously one such form of means, which has been employed heretofore in the prior art, to achieve a controlled internal disruption of the flow of water through a boiler tube has involved the usage of ribbing, i.e., rifling, on the internal surface of the boiler tube.

Unfortunately, however, for the most part the boiler tubes that have been manufactured in accordance with the teachings of the prior art heretofore have been adversely characterized in the fact that they each have suffered from certain notable disadvantages. For example, a major disadvantage associated with boiler tubes produced by the methods and apparatus that have been known previously for effecting the formation of ribbed boiler tubes resides in the variableness of the rib design, which the boiler tube is made to embody. That is, there is an inherent inflexibility associated with virtually all of the methods and apparatus taught by the prior art insofar as concerns the matter of effectuating variations in the configuration of the rib design that is provided on the surface of the inner wall of a boiler tube.

Namely, as noted previously herein nucleate boiling can lead to the development of localized hot spots that, in turn, cause overheating and ultimately boiler tube failures. To minimize the establishment of such localized hot spots in boiler tubes stemming from the existence of nucleate boiling, it has been proposed by the prior art to provide ribbing, i.e., rifling, on the inner wall surface of the tube. Unfortunately, however, the methods and apparatus known in the prior art heretofore for effectuating the making of such rifle tubing render it difficult to enable significant variations in pattern configuration to be implemented for purposes of compensating for variations in the location of potential hot spots along the inner walls of the tubes. That is, most of the existing methods and apparatus are limited to the utilization of fixed patterns, such that each boiler tube, irrespective of the location it occupies in the boiler, i.e., its relative exposure to external sources of heat, is necessarily provided with the same pattern of rifling, even though from a heat transfer standpoint, it may be desirable to vary the pattern as between locations within the same tube, as well as between tubes in the same boiler.

By way of exemplification in this regard, particular attention is directed to U.S. Pat. No. 3,272,961, which issued to L. A. Maier, Jr., et al. on Sept. 13, 1966, and wherein a method and apparatus are taught for making rib vapor generating tubes. In accordance with the teachings of this patent a rib in a nature of a weld deposit is formed on the inside surface of a tube through the use of a welding process. The method and apparatus as taught therein, however, are disadvantageously characterized by their total lack of flexibility in effecting adjustments in the rifled pattern that is being formed in a boiler tube to compensate for providing the boiler tube with different heat transfer characteristics in various locations along the length thereof. Namely, in accord with the teachings of U.S. Pat. No. 3,272,961 the implementation of the formation of a rifled pattern in a tube is predicated upon the creation of a pattern that comprises a repeat of the same configuration for the entire length of each individual boiler tube. Moreover, not only are changes in pattern of rifling as between different locations in the same tube difficult to effect with the apparatus described in the aforesaid U.S. Pat. No. 3,272,961, but also, it is difficult therewith to effect changes in the pattern of rifling as between different tubes, wherein it is desired to have them embody individual heat transfer characteristics. Principally, this is because to effect such changes requires the establishment of completely different relationships between the components, i.e., tube, welding means, etc., from those which these components bear one to another in order to effectuate the formation in a boiler tube in a given rib design. That is, these components must have different relationships one to another for each different pattern of rifling, i.e., rib design, with which it is desired to provide a boiler tube.

Consequently, in order to effectuate the exercise of control over the motion of the fluid flowing through a boiler tube, the use of a variety of forms, shapes, sizes and/or patterns that are suitably provided on the inner surface of the tube is relied upon for this purpose. More specifically, such control is effected through the employment of means, which, for purposes of the discussion herein, is characterized by being a rib, irrespective of the shape which the latter may embody, or whether it is continuous or discontinuous. Most importantly, the exact configuration which such a rib formed on the surface of the tube bore is made to embody is a variable that is dependent upon the type of fluid medium, the fluid pressure, the fluid flow rate, the tube size, the temperature gradient within the tube wall in both a circumferential and a longitudinal direction, as well as other variables. A consideration of these factors for purposes of providing the inner tube wall with the physical characteristics that are required in order to ensure a proper fluid movement therein, so as to maximize the heat transfer rate to the fluid medium, can lead to the utilization of a rib design wherein the parameters applicable thereto are selected from variations that are possible in the angle that the ribbing bears to the lateral axis of the tube; variations which are possible in the spacing between individual ribs of the ribbing; whether the ribbing is continuous or discontinuous; whether the ribbing is provided on only one internal side wall of the tube or on more than one internal side wall thereof; and the particular dimensions of the rib in terms of the specific height, the specific width, the specific radii and the specific angles that individual portions of a given rib embodies.

By way of illustration in this regard, variations in the angle that the ribs bear to the lateral axis of the tube and/or variations in the spacing between individual ribs in a given rib design offer a high degree of flexibility in compensating for the potential existence of localized hot spots. As a case in point, through a selection of the proper parameters from the aforesaid variables, it is possible to establish a rib design wherein provision is made for the creation of the desired fluid flow properties for each increment of the length so as to effect a realization of the proper fluid movement for maximizing the heat transfer rate along the entire length of the tube. It is to be noted that for purposes of achieving a maximization of the heat transfer rate, it is conceivable that it could be deemed necessary to utilize a rib design wherein variations exist therein in each increment of the length. Apart from those types of variations mentioned at the outset of this paragraph, the need to obviate the existence of localized hot spots may also dictate the use of a rib design that is discontinuous, i.e., wherein the rib design is provided only in areas of the tube inner surface that are exposed to a high heat flux, and/or rib design that is provided on only one side wall of the tube, i.e., on the side wall of the tube that corresponds to the heat source side thereof. Finally, note is taken of the fact that various rib shapes may be employed. In this regard, the rib that is utilized may be symmetrical in shape while in other instances it may be deemed advisable to employ other rib shapes which offer directional flow features that can be advantageous to pressure drop considerations. Also, it is noted that the film coefficient of heat transfer can be improved through the proper selection of the shape of the rib inasmuch as the former is known to be dependent upon the direction of fluid flow relative to the heating surface. As with the spacing and the pitch of the ribs, the height, width, radii and angles of the various rib shapes can be controlled to fulfill predetermined design criteria. In conclusion, it has been recognized that each rib shape and rib side wall provide an individual flow motion and pressure drop, thereby offering an infinite range of fluid motion control from which for design purposes a selection can be had in order to provide the desired individual flow characteristics for each incremental section of a heat transfer system.

As has been mentioned previously hereinabove, a boiler tube embodying a rib design on its inner wall surface which meets the requirements for effecting the maximization of control over the movement of fluid therethrough forms the subject matter of copending patent application Ser. No. 73,967, which bears a filing date of Sept. 10, 1979, now U.S. Pat. No. 4,314,587. In accord with the teachings thereof, the particular configuration of rib design, which the ribbing embodies, is selected on the basis of the capability thereof to fulfill certain predetermined design criteria that are established by the need to provide the boiler tube with the proper fluid flow properties along each increment of its length. To this end, the parameters that define the nature of the ribbed design that is utilized are selected from amongst a plurality of variables. These variables encompass the following: the angle which the ribs of the ribbing bear to the transverse axis of the tube, i.e., the pitch of the ribbing; the spacing that exists between the individual ribs that collectively comprise the ribbing; whether the ribbing is continuous or discontinuous; whether the ribbing is located on one longitudinally side wall of the tube, or on more than one side wall thereof; and the shape that the individual ribs embody in terms of the height, width, radii and angles thereof.

Now as regards the subject matter of the present application, this application is directed to an electrical control circuit that is designed to be cooperatively associated with suitable welding means so as to be operative for purposes of providing a boiler tube with fluid flow control means of the type described and illustrated in copending patent application Ser. No. 73,967, now U.S. Pat. No. 4,314,587. More specifically, there is described and illustrated herein an electrical control circuit that is capable of being employed for purposes of effecting the application of a weld deposited rib on the wall surface of a boiler tube while concomitantly control is being exercised therewith over the size, pitch and pattern which the weld deposited rib embodies.

Thus, it is an object of the present invention to provide an electrical control circuit that is employable in cooperative association with welding means.

It is another object of the present invention to provide such an electrical control means which when cooperatively associated with welding means is capable of being employed for purposes of applying a weld deposited rib to the inner wall surface of a boiler tube.

It is still another object of the present invention to provide such an electrical control circuit which is operative to be used for purposes of applying a weld deposited rib to the inner surface of a boiler tube while concomitantly control is being exercised therewith over the nature of the rib being deposited.

A further object of the present invention is to provide such an electrical control circuit which is operative to be used for purposes of applying a weld deposited rib to the inner surface of a boiler tube while concomitantly control is being exercised therewith over the size of the rib being deposited.

A still further object of the present invention is to provide such an electrical control circuit which is operative to be used for purposes of applying a weld deposited rib to the inner surface of a boiler tube while concomitantly control is being exercised therewith over the pitch of the rib being deposited.

Yet another object of the present invention is to provide such an electrical control circuit which is operative to be used for purposes of applying a weld deposited rib to the inner surface of a boiler tube while concomitantly control is being exercised therewith over the continuousness of the rib being deposited.

Yet still another object of the present invention is to provide such an electrical control circuit which is operative to be used for purposes of applying a weld deposited rib to the inner surface of a boiler tube while concomitantly control is being exercised therewith over the spacing of the rib being deposited.

Yet a further object of the present invention is to provide such an electrical control circuit which is advantageously characterized by the fact that it is relatively inexpensive to provide, and relatively easy to utilize.

SUMMARY OF THE INVENTION

In accordance with the present invention, there is provided a novel and improved electrical control circuit designed to be employed with welding means for purposes of effectuating the application of a weld deposited rib on the inner wall surface of a boiler tube. Further, the subject electrical control circuit is also operative to concomitantly effect control over the size, pitch and pattern of the rib as the latter is being deposited. For purposes of exercising control over the size and the pitch of the rib being deposited in the form of a weld on the inner surface of the boiler tube, the subject electrical control circuit includes first, second and third electronic speed controller means that are connected in electrical circuit relation with the rotational motor means, the linear travel motor means and the wire feed motor means, respectively, that are in turn cooperatively associated with the welding means. Moreover, the subject electrical control circuit also includes a dual purpose electronic speed controller means that is connected in electrical circuit relation with each of the aforesaid first, second and third electronic speed controller means such that through a common speed adjusting switch which the former has associated therewith, the former is operative to exercise control over each of the latter. For purposes of exercising control over the spacing and the continuousness of the rib, the first electronic speed controller means and the rotational motor means of the welding means are each of the servo type so as to enable the rapid reversing thereof to occur, such as may be required for purposes of forming the particular type of rib pattern with which it is desired to provide the boiler tube.

DESCRIPTION OF A PREFERRED EMBODIMENT

Figure 1:
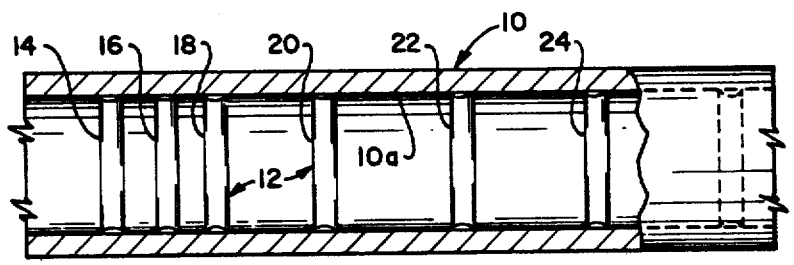
FIG. 1 is a cross sectional view of a portion of a tubular member, illustrated embodying ribbing in the form of a rib design wherein the ribs are discontinuous and variable spacing exists therebetween.

Referring now to the drawing, in each of FIGS. 1-6 thereof, there is depicted a tubular member, generally designated in FIG. 1 by the reference numeral 10, which embodies a particular configuration of ribbing that is intended to be exemplary in nature. More specifically, the tubular member, e.g., boiler tube, as shown in each of the aforesaid Figures, embodies ribbing consisting of a particular configuration of rib design that is provided on the inner surface thereof and which possesses the requisite physical characteristics that are needed in order to effect the proper movement of the fluid through the tube in each instance and thereby, as a result, achieve a maximization of the heat transfer rate to the fluid medium.

By way of reiteration, specific note is taken of the fact that with regard to the matter of the particular forms of construction that have been illustrated in each of FIGS. 1-6 of the drawing, such constructions are intended to constitute only a representative showing of a variety of different forms, shapes, sizes and/or patterns, which the ribbing provided on the tube inner surface may embody. In this regard, each tube depicted in the aforesaid Figures is designed to be provided with ribbing, which embodies a specific form of rib design. Moreover, each particular rib in a given rib design embodies a shape and a size that has been selected with particularity so as to ensure that each rib has the capability of producing a predetermined flow motion and a pressure drop. To summarize, it has been recognized that it is possible to provide a tubular member with ribbing of variable configuration wherein the later variably configured ribbing functions to advantageously imbue the tube through the use thereof with the capability of providing an infinite range of fluid motion control for design and selection. Thus, it is possible to provide the tube with the appropriate individual flow characteristics for each incremental section thereof such that the efficiency of the heat transfer, e.g., vapor generating, system in which the tube is to be utilized is maximized.

The nature of the configuration of the ribbing with which each tube depicted in the FIGS. 1-6 is provided is definable through the use of a multiplicity of parameters that, in turn, are selected amongst a plurality of factors, each of which is itself a variable. Numbered among these factors are the following: the angle which the ribs of the ribbing bear to the transverse axis of the tube, i.e., the pitch of the ribbing; the spacing that exists between the individual ribs that collectively function to comprise the ribbing; whether the ribbing is continuous or discontinuous; whether the ribbing is positioned solely on one longitudinally extending side wall of the tube, or on more than one longitudinally extending side wall thereof; and the nature of the shape of the individual ribs in terms of the height, width, radii and angles thereof.

A discussion of the above list of factors will now be had with particular reference to the Figures of the drawing. To this end, in FIG. 1 there is depicted a portion of a boiler tube 10 that embodies on the inside surface 10a thereof ribbing, the latter being designated therein generally by the reference numeral 12. The ribbing 12 is characterized by the fact that the individual ribs 14, 16, 18, 20, 22 and 24 are each discontinuous, i.e., are all unconnected one to another. Moreover, the spacing between the individual ribs 14, 16, 18, 20, 22 and 24 is variable, e.g., the spacing between the individual ribs 18 and 20 is greater than the spacing between the individual ribs 14 and 16. As illustrated in FIG. 1, the spacing between the ribs 20, 22 and 24 is substantially the same, while the spacing between the ribs 14, 16 and 18 similarly is substantially the same. However, it is to be understood that other spacings could equally well have been utilized between the ribs 14, 16, 18, 20, 22 and 24 of the ribbing 12, if such had been so desired. In summary, for purposes of the discussion set forth herein, FIG. 1 is simply intended to depict a rib design, i.e., the ribbing 12 wherein the ribs 14, 16, 18, 20, 22 and 24 thereof are discontinuous and the spacing therebetween varies.

Figure 2:
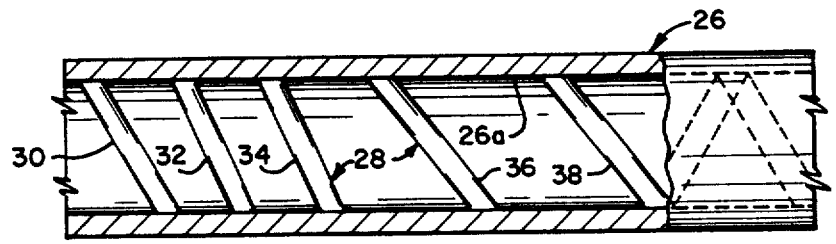
FIG. 2 is a cross sectional view of a portion of a tubular member, illustrated embodying ribbing in the form of a rib design wherein the ribs are continuous and are of variable pitch.

Turning next to a consideration of FIG. 2, there is illustrated therein a portion of a boiler tube 26 embodying on the inner surface 26a thereof ribbing, generally designated by the reference numeral 28. The ribbing 28 is characterized in the fact that the individual ribs 30, 32, 34, 36 and 38 are continuous, i.e., are all interconnected one to another, and the fact that the angle which the ribs 30, 32, 34, 36 and 38 bear to the transverse axis of the tube 26 is a variable. As concerns the latter, the pitch of the ribs 32 and 34 is illustrated as being substantially the same, while the pitch of the ribs 36 and 38 is likewise depicted as being substantially the same. Summarizing, FIG. 2 is designed to depict a tube 26 wherein the ribbing 28 thereof consists of ribs 30, 32, 34, 36 and 38 which are continuous and of variable pitch.

Figure 3:
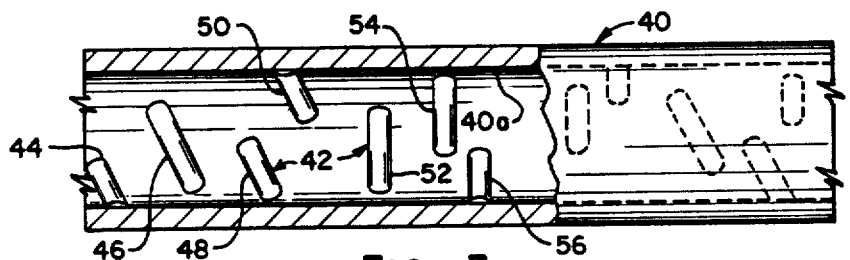
FIG. 3 is a cross sectional view of a portion of a tubular member, illustrated embodying ribbing in the form of a rib design wherein the ribs are of variable length and of variable pitch.

FIG. 3 is directed to a tube 40, which is provided on the inner surface 40a thereof, with ribbing generally designated therein by reference numeral 42 embodying a randomly patterned rib design. More specifically, the ribbing 42 consists of a random pattern of individual ribs 44, 46, 48, 50, 52, 54 and 56. Moreover, the ribbing 42 is characterized in the fact that the ribs 44, 46, 48, 50, 52, 54 and 56 all vary in length, and in the fact that the pitch thereof also varies. The intent here is to show, through the illustration of the tube 40 in FIG. 3, that a tube 40 is capable of being provided with the ribbing 42 wherein the configuration of the latter takes the form of a rib design of randomly patterned ribs.

Figure 4:
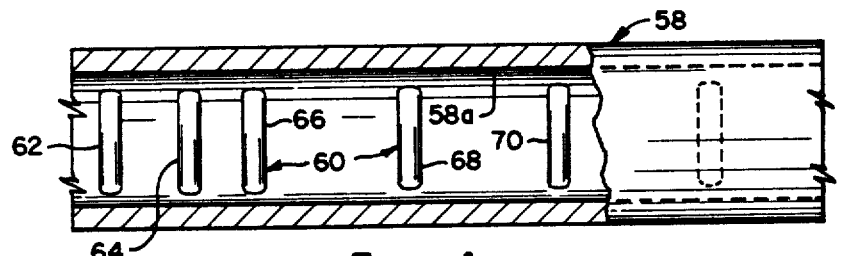
FIG. 4 is a cross sectional view of a portion of a tubular member, illustrated embodying ribbing in the form of a rib design that is provided on only one longitudinally extending side wall of the tubular member and wherein the ribs are discontinuous and uniform spacing exists between some of the ribs and variable spacing exists between others of the ribs.

Continuing on to a discussion of FIG. 4 of the drawing, there is illustrated therein a tube 58 having ribbing, generally designated therein by reference numeral 60, provided on the inner surface 58a of the former. The ribs 62, 64, 66, 68 and 70 that comprise the ribbing 60 are all suitably located on only one longitudinally extending side wall of the tube 58. Moreover, the ribs 62, 64, 66, 68 and 70 are each discontinuous and the spacing therebetween may be either uniform as in the case of ribs 62, 64 and 66, or ribs 66, 68 and 70, or the spacing therebetween may vary as that existing between ribs 64 and 66, and ribs 66 and 68. The function of FIG. 4 is intended to be that of providing a showing of a tube 58 which has ribbing 60 located on only one side wall thereof, and a showing of such a ribbing 60 wherein the ribs 62, 64, 66, 68 and 70 are discontinuous and the spacing therebetween may be either uniform or variable.

Figure 5:
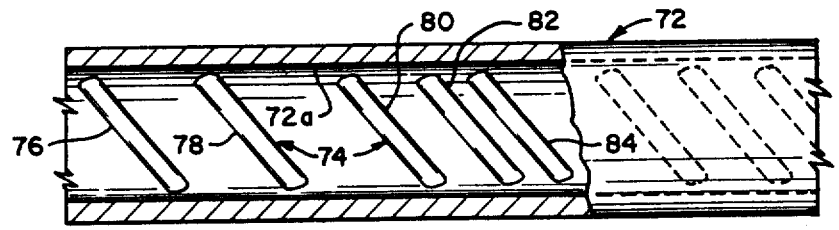
FIG. 5 is a cross sectional view of a portion of a tubular member, illustrated embodying ribbing in the form of a rib design that is provided on only one longitudinally extending side wall of the tubular member and wherein all of the ribs are discontinuous but some of the ribs are of variable pitch and some of the ribs are of uniform pitch.

FIG. 5 is similar to FIG. 4 in that there is depicted therein a portion of a tube 72, which embodies on the inner surface 72a thereof ribbing, generally designated by reference numerals 74 and wherein the ribbing 74 is located on only one longitudinally extending side wall of the tube 72. Like the ribs 62, 64, 66, 68 and 70, which comprise the ribbing 60 that is depicted in FIG. 4, the ribs 76, 78, 80, 82 and 84, which comprise the ribbing 74 shown in FIG. 5, are all discontinuous. However, the notable difference therebetween is that the pitch of the ribs 76, 78, 80, 82 and 84 may be either uniform as in the case of the ribs 76 and 78 or the ribs 82 and 84, or the pitch thereof may be variable as in the case of the ribs 76 and 84. FIG. 5 has been included in the drawing of the instant application for purposes of providing a showing of a tube 72 that embodies ribbing 74 which is located on only one longitudinally extending side wall thereof, and wherein the ribs 76, 78, 80, 82 and 84 are discontinuous and may be of either uniform or variable pitch.

Figure 6:
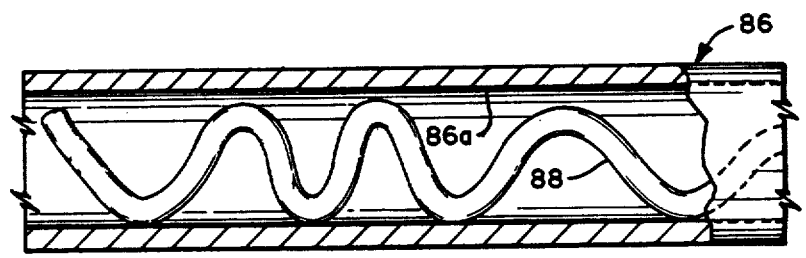
FIG. 6 is a cross sectional view of a portion of a tubular member, illustrated embodying ribbing in the form of a rib design that is provided on only one longitudinally extending side wall of the tubular member and wherein the ribs are continuous but some of the ribs are of variable pitch and some of the ribs are of uniform pitch.

FIG. 6 contains a showing of a tube 86 that embodies a construction, which is similar to that of the tubes 58 and 72 of FIGS. 4 and 5, respectively. Namely, the tube 86 embodies on the inner surface 86a thereof ribbing, generally designated by reference numeral 88, that is positioned entirely on only one longitudinally extending side wall of the tube 86. However, unlike the ribbing 60 and the ribbing 74 with which the tube 58 and the tube 72, respectively, are provided, the ribbing 88 with which the tube 86 is provided is continuous. Moreover, like the ribbing 74 of the tube 72, the ribbing 88 of the tube 86 may be of either uniform or variable pitch. Thus, FIG. 6 is intended to provide a showing of a tube 86 embodying continuous ribbing 88 that is located on only one longitudinally extending side wall of the tube 86, and ribbing 88 which may be either uniform or variable pitch.

Figure 7:
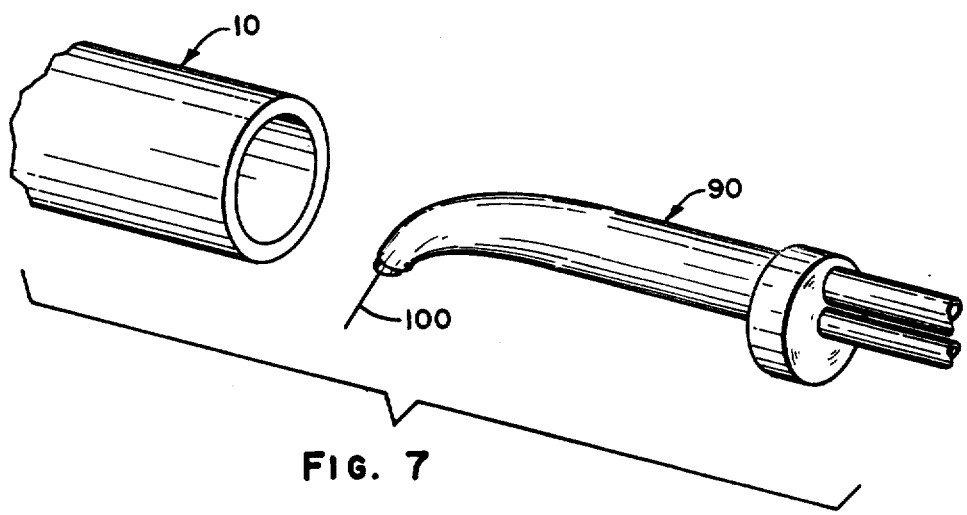
FIG. 7 is a perspective view of a tubular member illustrated with a welding means cooperatively associated therewith of the type that is suitable for use for purposes of providing the tubular member with rib designs of the nature of those depicted in FIGS. 1-6.
Figure 8:
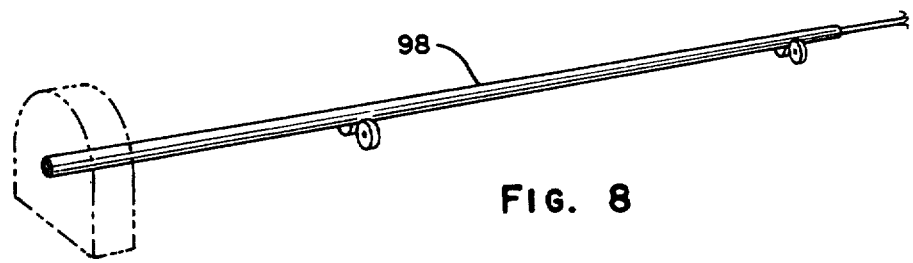
FIG. 8 is a perspective view of the welding means of FIG. 7, illustrating the elongated nature thereof.

Turning now to a consideration of FIGS. 7 and 8 of the drawing, there is depicted therein a welding means, generally designated by reference numeral 90. The welding means 90 embodies a construction that enables it to be cooperatively associated with an electrical control circuit, constructed in accordance with the present invention. When so associated with the electrical control circuit of the present invention, the welding means 90 is operative to effect the deposition of a weld in the form of a rib on the inner surface of a boiler tube, e.g., the tube 10 of FIGS. 1 and 7. Collectively the ribs so deposited through the use of the welding means 90 constitute ribbing that embodies a rib design of the nature of those shown in FIGS. 1–6 of the drawing.

Although one particular embodiment of welding means 90 has been selected for illustration in FIGS. 7 and 8 of the drawing, it is to be understood that any suitable conventional form of welding means could be utilized for this purpose in lieu thereof. Moreover, as such, it is not deemed necessary for purposes of acquiring an understanding of the present invention that the nature of the construction and the mode of operation of the welding means be described and/or illustrated herein in detail. Rather, it is deemed sufficient for purposes of obtaining an understanding of the present invention that note simply be taken of the following matters relative to the welding means 90. First, the welding means 90 must be suitably dimensioned, particularly as regards its diameter and length, so as to be both capable of being inserted within the bore of the tube 10 as well as capable of being made to extend substantially the entire length of the tube 10. These dimensional considerations are dictated by the fact that the ribbing created by the use of the welding means 90 appears at selected points along substantially the entire length of the inner surface of the tube 10. Secondly, the mode of operation of the welding means 90 is such that for purposes of forming ribbing on the inner surface of the tube 10 there is a need for there to occur relative rotational movement as well as relative linear travel between the welding means 90 and the tube 10. Thirdly, the welding means 90 should embrace means operative for effecting the feed of the weld wire as the wire becomes consumed in the course of being deposited in the form of a welded rib on the inner surface of the tube 10. To this end, the welding means 90 in accord with the illustrated embodiment thereof includes rotational motor means, linear travel motor means and weld wire feed motor means, that are denoted generally in FIGS. 9 and 10 of the drawing by the reference numerals 92, 94 and 96, respectively. Any form of motor means of conventional construction suitable for use in the aforesaid manner may be employed for these purposes. Thus, to summarize, as best understood with reference to FIGS. 7 and 8 of the drawing, the welding means 90 basically comprises an elongated member, designated by reference numeral 98 in FIG. 8, from which there projects a weld wire, designated by reference numeral 100 in FIG. 7.

Figure 9:
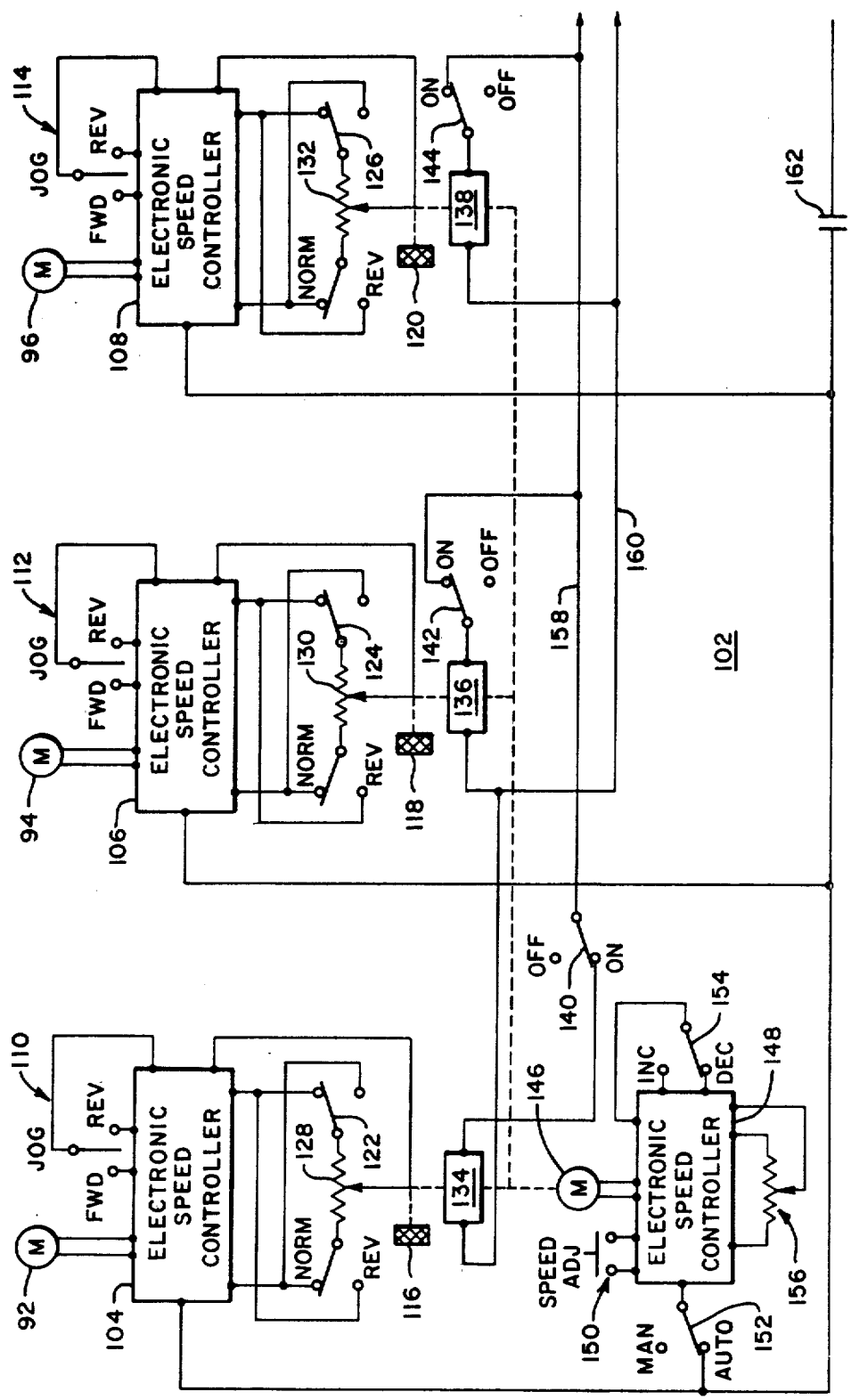
FIG. 9 is a schematic diagram of an electrical control circuit constructed in accordance with the present invention, illustrating the controls that are employed for purposes of exercising control over rib size and rib pitch.

A discussion will now be had of the nature of the construction and the mode operation of the electrical control circuit, which forms the subject matter of the present invention. For this purpose, reference will be had in particular to each of FIGS. 9, 10 and 11 of the drawing. Thus, with reference first to FIG. 9, as will be readily apparent therefrom to anyone skilled in the art, the electrical control circuit, generally designated in the drawing by reference numeral 102, embodies as depicted in FIG. 9 a form of construction wherein the rotational motor means 92 is connected in electrical circuit relation with a first electronic speed controller means 104, the linear travel motor means 94 is connected in electrical control circuit relation with a second electronic speed controller means 106, and the weld wire feed motor means 96 is connected in electrical circuit relation with a third electronic speed controller means 108. The function of each of the first electronic speed controller means 104, the second electronic speed controller means 106 and the third electronic speed controller means 108 is to exercise control therethrough over the operation of the rotational motor means 92, the linear travel motor means 94 and the weld wire feed motor means 96, respectively. More specifically, through the operation of the respective one of the three aforesaid electronic speed controller means 104, 106 and 108 the motor means cooperatively associated therewith, i.e., the motor means 92, 94 and 96, respectively, can be made to have different modes of operation. To this end, the electrical control circuit 102 of FIG. 9 includes the circuitry, which is designated in the FIG. 9 by the reference numerals 110, 112 and 114, respectively, and with which circuitry there is seen associated in FIG. 9 the legends JOG, FWD, REV. With further regard to the three electronic speed controller means 104, 106 and 108, each one thereof is preferably provided with manual adjustment means, the latter being identified in FIG. 9 by the reference numerals 116, 118 and 120, respectively. Also, each of the three electronic speed controller means 104, 106 and 108 in addition has operatively associated therewith suitable switch means 122, 124 and 126, respectively, operative for enabling the former to be operated either in a NORMAL or in a REVERSE operating mode. As seen with reference to FIG. 9, a potentiometer 128, 130 and 132, respectively, is connected in electrical circuit relation with a corresponding one of the switch means 122, 124 and 126, and therethrough thus to a corresponding one of the three electronic speed controller means 104, 106 and 108. Lastly, each of the three electronic speed controller means 104, 106 and 108 has a clutch means 134, 136 and 138, respectively, cooperatively associated therewith. Moreover, each of the clutch means 134, 136 and 138 as shown in FIG. 9 is provided with a suitble conventional form of ON-OFF switch means 140, 142 and 144, respectively. Summarizing the preceding, the electrical control circuit 102 as shown in FIG. 9 embodies a form of circuit construction wherein the rotational motor means 92, the linear travel motor means 94 and the weld wire feed motor means 96 each have cooperatively associated therewith a motorized potentiometer, clutch means and controller means; namely, in the case of the rotational motor means 92 the potentiometer 128, the clutch means 134 and the controller means 104; in the case of the linear travel motor means 94 the potentiometer 130, the clutch means 136 and the controller means 106; and in the case of the weld wire feed motor means 106 the potentiometer 132, the clutch means 138 and the controller means 108. The motor means, by which the aforesaid motorization is effected, is designated by the reference numeral 146 in FIG. 9.

Continuing with the description of the electrical control circuit 102 of FIG. 9, a dual purpose electronic speed controller means 148 is connected in electrical circuit relation in common with each of the three electronic speed controller means 104, 106 and 108. Associated with the dual purpose electronic speed controller means 148 is a common speed adjusting switch 150. In accordance with the embodiment of the electrical control circuit 102 as depicted in FIG. 9, the dual purpose electronic speed controller means 148 preferably is provided with a suitable conventional form of first and second switch means 152 and 154. The first switch means 152 is intended to be operative for purposes of selectively causing the dual purpose electronic speed controller means 148 to be either in a manual operating mode or an automatic operating mode. Similarly, the second switch means 154 enables an adjustment function to be accomplished therewith; namely, the second switch means 154 enables the dual purpose electronic speed controller means 148 to be placed in either an increasing or decreasing operating mode. Lastly, the controller means 148 is preferably provided with a further form of adjustment effecting means, i.e., the taper rate adjustment means comprising the circuitry, generally designated by the reference numeral 156 in FIG. 9.

Concluding the description of the circuit construction of the electrical control circuit 102 shown in FIG. 9, power is provided through the conductors 158 and 160 to the clutch means 134, 136 and 138 from a conventional power supply (not shown) suitable for use for this purpose. Finally, it will be seen from FIG. 9 that the electrical control circuit 102 incorporates a start relay 162 through which energization of the electrical control circuit 102 is effected. Insofar as concerns the matter of the mode of operation of the electrical control circuit 102 of FIG. 9, the latter is designed to be employed principally for the purpose of exercising control over the size of the ribbing with which, through the use of welding means such as welding means 90 of FIGS. 7 and 8, it is desired to provide a boiler tube, e.g., the tube 10 of FIGS. 1 and 7. To this end, the electronic speed motor controller means 104, 106 and 108 are used for purposes of effecting control over the rotation, the linear travel and the wire feed, respectively, of the welding means 90. Accordingly, the controller means 104, 106 and 108 each have jogging switches associated therewith as part of the circuitry denoted by reference numerals 110, 112 and 114, respectively, in FIG. 9. In addition, for set up and calibration purposes the electronic speed controller means 104, 106 and 108 each possess the capability of being set up independently.

Continuing with a description of the mode of operation of the electrical control circuit 102 of FIG. 9, when the start relay 162 is energized, the rotational motor means 92, the linear travel motor means 94 and the weld wire feed motor means 96 are each automatically started. Additionally, each of the clutch means 134, 136 and 38 should be energized so that all of the electronic speed controller means 104, 106 and 108 are controlled by a common speed adjustment means 150 associated with the dual purpose electronic speed controller means 148. In the manual mode, the combination of motorized potentiometer 128, 130, respectively, clutch means 134, 136, respectively, and controller means 104, 106, respectively are used to increase or decrease in coordination the speeds of the rotational motor means 92 and the linear travel motor means 94 so as to thereby enable a constant pitch to be maintained. The weld wire feed motor means 96, however, can also be coordinated with the aforementioned speed adjustments so as to thereby effect maintaining of ribbing which is of a constant size. On the other hand, though, if so desired, each of the rotational motor means 92, linear travel motor means 94 and weld wire feed motor means 96 is capable of being made to operate independently simply by deenergizing the respective clutch means 134, 136 or 138, that is cooperatively associated therewith.

Should it be desired to have a controlled tapered rate, this is achieved by ensuring that the manual-automatic switch means 152 is in the automatic position. The dual purpose electronic speed controller means 148 will then be driven at a rate which is dependent upon the setting occupied by the taper rate control means 156. Note is also taken here of the fact that for purposes of exercising control with the electrical control circuit 102 of FIG. 9 over ribbing size, all of the potentiometers 128, 130 and 132 associated with the controller means 104, 106 and 108, respectively, should be in the normal position, i.e., the switch means 122, 124 and 126, respectively, should occupy the normal position thereof. Lastly, mention is made of the fact that the taper adjustment means 156 may be suitably set so as to effect either an increase or decrease in speed.

To employ the electrical control circuit 102 of FIG. 9 for purposes of exercising control over the pitch of the ribbing, it is only necessary to reverse one of the potentiometers 128, 130 associated with the rotational motor means 92 and the linear travel motor means 94, respectively, but not both. Notwithstanding the aforesaid reversal of one of the potentiometers 128, 130, the rotational motor means 92 and the linear travel motor means 94 will still be coordinated such that as one of the latter increases in speed the other one will experience a proportional decrease in speed. Finally, it is to be understood that the weld wire feed motor means 96 can be coordinated with the rotational motor means 92 and the linear travel motor means 94 or be made to operate independently thereof, as desired.

Figure 10:
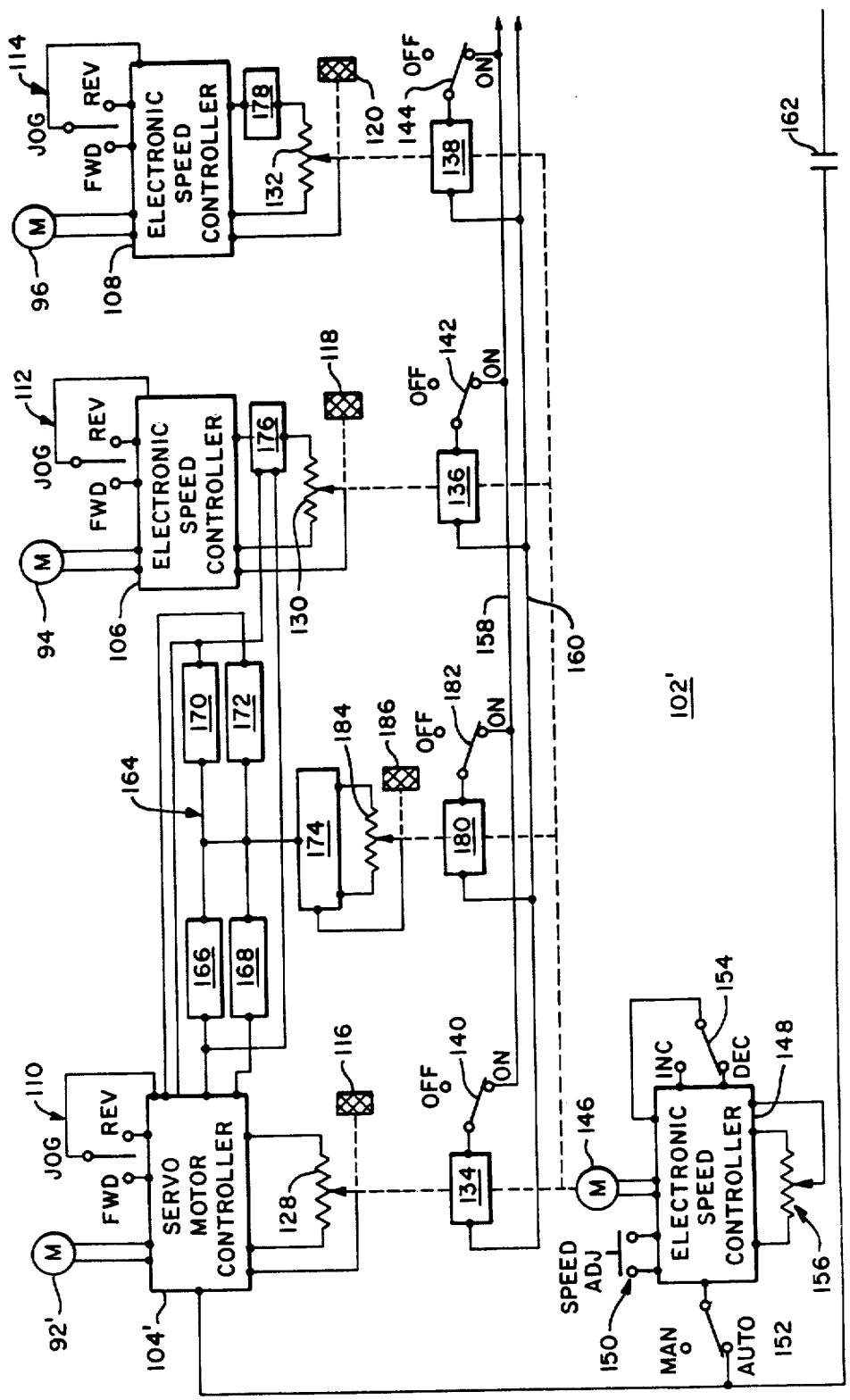
FIG. 10 is a schematic diagram of an electrical control circuit constructed in accordance with the present invention, illustrating the controls that are employed for purposes of exercising control over the nature of the rib pattern.

Attention will now be directed to FIG. 10 of the drawing. There is illustrated therein a modified version of the electrical control circuit 102 of FIG. 9. Accordingly, the electrical control circuit of FIG. 10 has been generally designated therein by the reference numeral 102'. Moreover, inasmuch as many of the same components are utilized in both the electrical control circuit 102 of FIG. 9 and the electrical control circuit 102' of FIG. 10, the same reference numerals have been used in both Figures to facilitate the identification of such components.

As illustrated in FIG. 10, the electrical control circuit 102' embodies a circuit construction that renders it operative when cooperatively associated with the welding means 90 of FIGS. 7 and 8 to effect the exercise of control over providing a boiler tube, e.g., the tube 10 of FIGS. 1 and 7 with ribbing possessing a rib design wherein the latter is located on only a portion of the tube bore. To this end, the principal structural difference between the electrical control circuit 102 of FIG. 9 and the electrical control circuit 102' of FIG. 10 is that in the latter the rotational motor means 92' and the electronic speed controller means 104' cooperatively associated in circuit relation therewith are of the servo type so that rapid reversing thereof can be effected. Otherwise, however, in the electrical control circuit 102' of FIG. 10, both the linear travel motor means 94 and the weld wire feed motor means 96 as well as the electronic speed controller means 106 and 108, respectively, that are cooperatively associated in circuit relation therewith embody essentially the same construction and mode of operation as the corresponding components with which the electrical control circuit 102 of FIG. 9 is provided.

Figure 11:
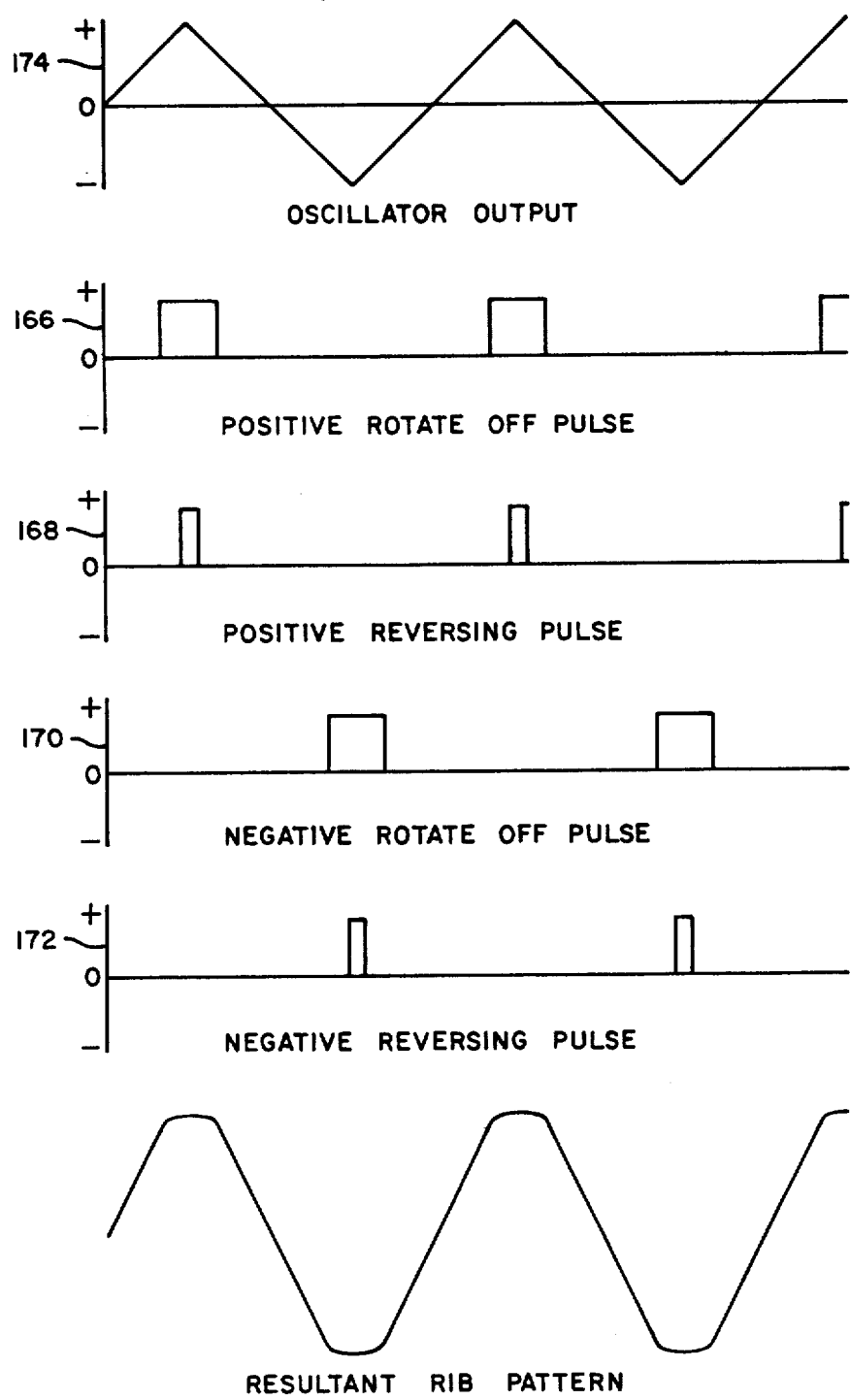
FIG. 11 is an illustration of waveforms that are produced by the electrical control circuit depicted in FIG. 10.

In the electrical control circuit 102' of FIG. 10 for purposes of controlling the reversing of the rotational motor means 92' and the speeding up of the linear travel motor means 94, a low frequency function generator means, designated generally in FIG. 10 by reference numeral 164, and having a triangular waveform is used. As best understood with reference to both FIGS. 10 and 11 of the drawing, the function generator means 164 encompasses four comparators 166, 168, 170 and 172 as well as the oscillator 174. Thus, as shown in FIG. 11 the four comparators 166, 168, 170 and 172 are utilized for purposes of giving a signal, i.e., output pulse, when certain points of the oscillation provided by the oscillator 174 are reached. More specifically, the nature of the pulses provided by the four comparators 166, 168, 170 and 172 are as follows: a positive rotate off pulse from the comparator 166, a positive reversing pulse from the comparator 168, a negative rotate off pulse from the comparator 170, and a negative reversing pulse from the comparator 172.

When the first comparator 166 operates, the rotational motor means 92' is turned OFF and the linear travel motor means 94 speeds up. In this regard, note is taken here of the fact that speed range control means 176 and 178 are cooperatively associated in circuit relation with the linear travel motor means 94 and the weld wire feed motor means 96, respectively. The second comparator 168 starts the rotational motor means 92' in the opposite direction and the linear travel motor means 94 is set to its normal speed. The third comparator 170 and the fourth comparator 172 are operative to provide the same sequential mode of operation during the negative portion of the cycle. Thus, the sequence is designed to continue for the duration of the weld cycle. A taper feature may be used with the electrical control circuit 102' of FIG. 10 similar to that employed with the electrical control circuit 102 of FIG. 9, and to which reference has previously been had hereinbefore. Namely, this can be accomplished through the utilization of a combination of a motorized potentiometer 128, 130 and 132, respectively; clutch means 134, 136 and 138, respectively; and controller means 104', 106 and 108, respectively. In accord with the illustrated embodiment of the electrical control circuit 102' of FIG. 10, all of the controller means 104', 106 and 108, and the function generator means 164 are controlled from the same source, i.e., the dual purpose electronic speed controller means 148 so that coordination of the rotation, the linear travel and the weld wire feed of the welding means 90 is maintained. In this regard, it should be noted that as illustrated in FIG. 10, the function generator means 164 has connected in electrical circuit relation therewith clutch means 180, an ON-OFF switch 182 associated with the clutch means 180, a potentiometer 184, and a manual adjustment means 186.

In conclusion, with the electrical control circuit 102' of FIG. 10, the weld wire feed motor means 96 can be used independently, or may be used with negative feedback to decrease the wire feed rate during the speed up time of the linear travel motor means 94. Such a mode of operation would assist in the maintaining of ribbing having a constant size.

Accordingly, from the foregoing it should now be readily apparent that in accordance with the present invention there has been provided a new and improved electrical control circuit that is employable in cooperative association with welding means. Moreover, the electrical control circuit of the present invention when cooperatively associated with welding means is capable of being employed for purposes of applying a weld deposited rib to the inner wall surface of a boiler tube. In addition, in accord with the present invention an electrical control circuit is provided which is operative for use for purposes of applying a weld deposited rib to the inner wall surface of a boiler tube while concomitantly control is being exercised therewith over the nature of the rib being deposited. Furthermore, the electrical control circuit of the present invention is operative for use for purposes of applying a weld deposited rib to the inner wall surface of a boiler tube while concomitantly control is being exercised therewith over the size of the rib being deposited. Additionally, in accordance with the present invention an electrical control circuit is provided which is operative for use for purposes of applying a weld deposited rib to the inner wall surface of the boiler tube while concomitantly control is being exercised therewith over the pitch of the rib being deposited. Also, the electrical control circuit of the present invention is operative for use for purposes of applying a weld deposited rib to the inner wall surface of a boiler tube while concomitantly control is being exercised therewith over the continuousness of the rib being deposited. Further, in accord with the present invention an electrical control circuit is provided which is operative for use for purposes of applying a weld deposited rib to the inner wall surface of a boiler tube while concomitantly control is being exercised therewith over the spacing of the rib being deposited. Finally, the electrical control circuit of the present invention is advantageously characterized by the fact that it is relatively inexpensive to provide, and relatively facile to utilize.

While only one embodiment of my invention has been shown, it will be appreciated that modifications thereof, some of which have been alluded to hereinbefore, may still be readily made thereto by those skilled in the art. I, therefore, intend by the appended claims, to cover the modifications alluded to herein as well as all other modifications, which fall within the true spirit and scope of my invention.

What is claimed is:

1. An electrical control circuit, employable in cooperative association with welding means embodying rotational motor means, linear travel motor means and weld wire feed motor means, for purposes of effecting the exercise of control over the deposition by the welding means of ribbing on the inner wall surface of a tubular member comprising:
   a. electronic speed controller means connected in electrical circuit relation with the rotational motor means, the linear travel motor means and the weld wire feed motor means of the welding means, said electronic speed controller means being operative to control the rotational, linear travel and weld wire feed of the welding means;
   b. motorized clutch means operatively connected to said electronic speed controller means and operative for determining the nature of the mode of operation of said electronic speed controller means;
   c. potentiometer means operatively connected to both said motorized clutch means and said electronic speed controller means, said potentiometer means being operative in combination with said electronic speed controller means and said motorized clutch means for effectuating control over the operation of the rotational motor means, the linear travel motor means and the weld wire feed motor means of the welding means;
   d. a dual purpose electronic speed controller means operatively connected to said electronic speed controller means, said dual purpose electronic speed controller means possessing the dual capability of being able to operate in either a manual operating mode or an automatic operating mode, and of being able to operate in either an increasing operating mode or a decreasing operating mode; and
   e. a speed adjusting switch means connected in electrical circuit relation with said dual purpose electronic speed controller means, said speed adjusting switch means being operative for purposes of coordinating through said dual purpose electronic speed controller means the speed of operation established by said electronic speed controller means for the rotational motor means, the linear travel motor means and the weld wire feed motor means of the welding means.

2. The electrical control circuit as set forth in claim 1 wherein said electronic speed controller means includes a first electronic speed controller means connected in electrical circuit relation with the rotational motor means of the welding means, said first electronic speed controller means being operative for controlling the mode of operation of the rotational motor means of the welding means.

3. The electrical control circuit as set forth in claim 2 wherein said first electronic speed controller means is of the servo type.

4. The electrical control circuit as set forth in claim 2 wherein said motorized clutch means includes a first motorized clutch means operatively connected to said first electronic speed controller means and operative for determining the nature of the mode of operation of said first electronic speed controller means.

5. The electrical control circuit as set forth in claim 4 wherein said potentiometer means includes a first potentiometer means operatively connected to both said first motorized clutch means and said first electronic speed controller means, said first potentiometer means being operative in combination with said first electronic speed controller means and said first motorized clutch means for effectuating control over the operation of the rotational motor means of the welding means.

6. The electrical control circuit as set forth in claim 5 wherein said electronic speed controller means includes a second electronic speed controller means connected in electrical circuit relation with the linear travel motor means of the welding means, said second electronic speed controller means being operative for controlling the mode of operation of the linear travel motor means of the welding means.

7. The electrical control circuit as set forth in claim 6 wherein said motorized clutch means includes a second motorized clutch means operatively connected to said second electronic speed controller means and operative for determining the nature of the mode of operation of said second electronic speed controller means.

8. The electrical control circuit as set forth in claim 7 wherein said potentiometer means includes a second potentiometer means operatively connected to both said second motorized clutch means and said second electronic speed controller means, said second potentiometer means being operative in combination with said second electronic speed controller means and said second motorized clutch means for effectuating control over the operation of the linear travel motor means of the welding means.

9. The electrical control circuit as set forth in claim 8 wherein said electronic speed controller means includes a third electronic speed controller means connected in electrical circuit relation with the weld wire feed motor means, said third electronic speed controller means being operative for controlling the mode of operation of the weld wire feed motor means of the welding means.

10. The electrical control circuit as set forth in claim 9 wherein said motorized clutch means includes a third motorized clutch means operatively connected to said third electronic speed controller means and operative for determining the nature of the mode of operation of said third electronic speed controller means.

11. The electrical control circuit as set forth in claim 10 wherein said potentiometer means includes a third potentiometer means operatively connected to both said third motorized clutch means and said third electronic speed controller means, said third potentiometer means being operative in combination with said third electronic speed controller means and said third motorized clutch means for effectuating control over the operation of the weld wire feed motor means of the welding means.

* * * * *